(12) United States Patent
Maeda et al.

(10) Patent No.: US 12,318,950 B2
(45) Date of Patent: Jun. 3, 2025

(54) ADJUSTMENT SUPPORT SYSTEM AND ADJUSTMENT SUPPORT METHOD

(71) Applicant: Hitachi, Ltd., Tokyo (JP)

(72) Inventors: Masaaki Maeda, Tokyo (JP); Daiki Kajita, Tokyo (JP)

(73) Assignee: HITACHI, LTD., Tokyo (JP)

( * ) Notice: Subject to any disclaimer, the term of this patent is extended or adjusted under 35 U.S.C. 154(b) by 441 days.

(21) Appl. No.: 17/854,541

(22) Filed: Jun. 30, 2022

(65) Prior Publication Data

US 2023/0011093 A1 Jan. 12, 2023

(30) Foreign Application Priority Data

Jul. 12, 2021 (JP) .................................. 2021-115117

(51) Int. Cl.
B25J 9/16 (2006.01)

(52) U.S. Cl.
CPC .......... *B25J 9/1697* (2013.01); *B25J 9/1653* (2013.01); *B25J 9/1664* (2013.01)

(58) Field of Classification Search
CPC ....... B25J 9/1697; B25J 9/1653; B25J 9/1665
See application file for complete search history.

(56) References Cited

U.S. PATENT DOCUMENTS

| | | | | |
|---|---|---|---|---|
| 2016/0184997 A1* | 6/2016 | Uchiyama | .............. | B25J 9/1697 700/259 |
| 2017/0277167 A1* | 9/2017 | Noda | ...................... | B25J 9/1643 |
| 2017/0341231 A1* | 11/2017 | Tan | .......................... | B25J 9/162 |
| 2017/0358048 A1* | 12/2017 | Kotake | ................. | G06T 1/0007 |
| 2019/0279354 A1* | 9/2019 | Inazumi | ................ | G06T 7/0004 |
| 2020/0147804 A1* | 5/2020 | Sugiyama | .................. | G06T 7/73 |
| 2021/0181728 A1* | 6/2021 | Yamaguchi | ...... | G05B 19/41885 |
| 2023/0068692 A1* | 3/2023 | Ogura | .................. | G06V 10/469 |
| 2023/0296022 A1* | 9/2023 | Seng | ..................... | B25J 13/088 294/2 |

FOREIGN PATENT DOCUMENTS

JP     2016-099257 A      5/2016

* cited by examiner

*Primary Examiner* — Thomas E Worden
*Assistant Examiner* — Jay Khandpur
(74) *Attorney, Agent, or Firm* — Volpe Koenig

(57) ABSTRACT

An adjustment support system comprises an arithmetic unit and a storage unit. The storage unit stores sensor information including features of a sensor that captures an image of a target, and imaging target information including dimensions, shape, and disposition of an imaging target of the sensor, and the arithmetic unit generates a plurality of candidates for an imaging position and posture of the imaging target by the sensor, and determines whether or not positional deviation of the imaging target in a plurality of directions is detectable from a captured image obtained by the sensor based on the sensor information and the imaging target information, with respect to each of the plurality of candidates for the imaging position and the imaging posture. The arithmetic unit then determines an imaging position and posture for the sensor to actually capture an image of the target from the plurality of candidates.

13 Claims, 13 Drawing Sheets

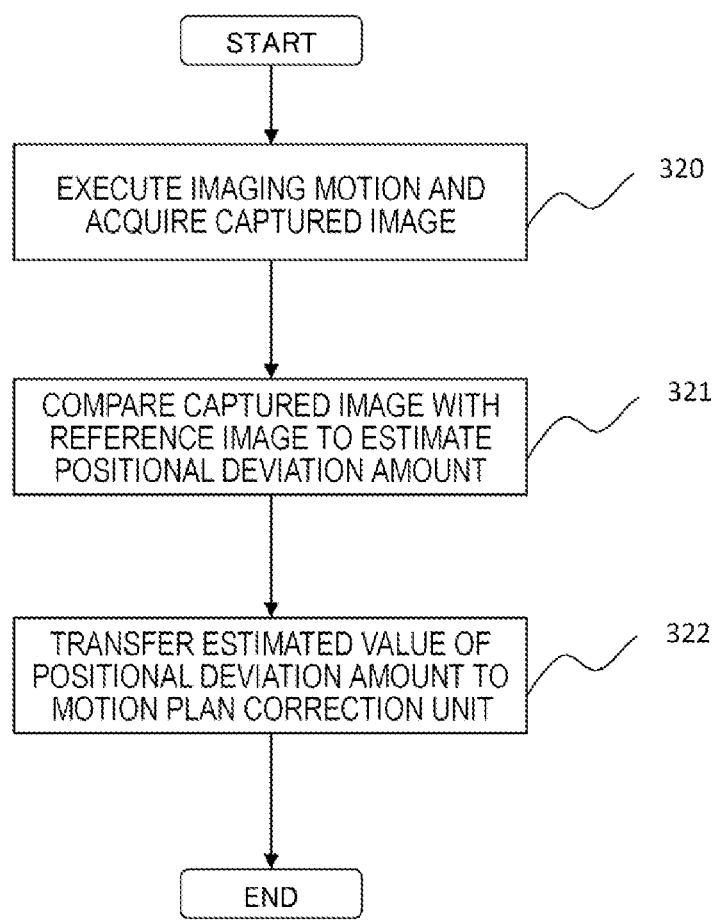

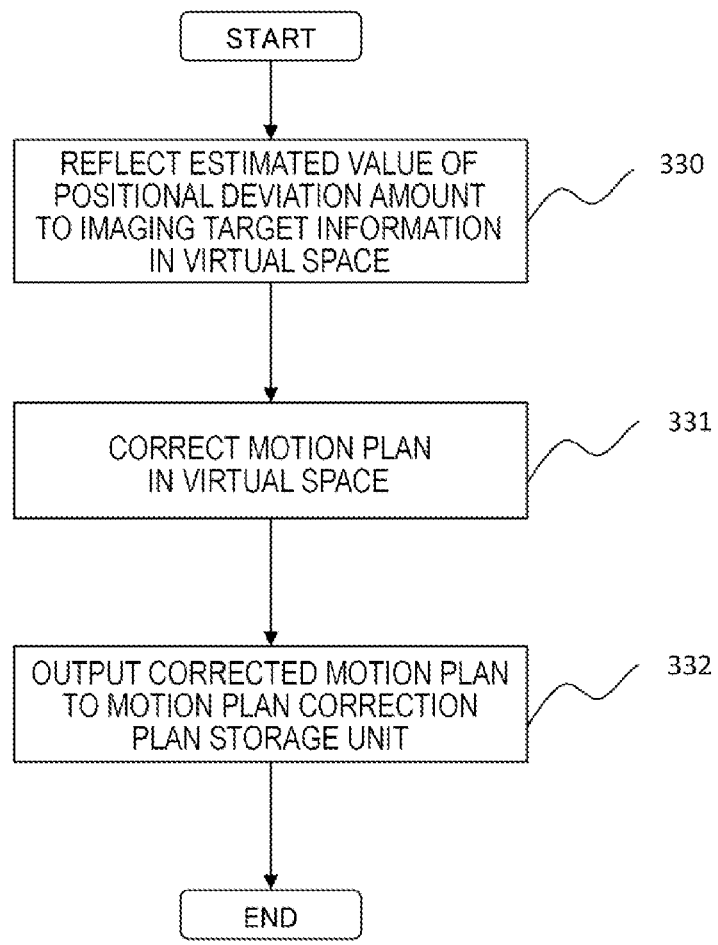

ADJUSTMENT SUPPORT SYSTEM AND ADJUSTMENT SUPPORT METHOD

CLAIM OF PRIORITY

The present application claims priority from Japanese patent application JP 2021-115117 filed on Jul. 12, 2021, the content of which is hereby incorporated by reference into this application.

BACKGROUND OF THE INVENTION

1. Field of the Invention

The present invention relates to an equipment adjustment support technology in a manufacturing line.

2. Description of Related Art

In the manufacturing industry, short-term renovation of equipment in the manufacturing line is required in order to respond quickly to changes in the production environment such as prevalence of infectious diseases and occurrence of natural disasters. Since the components of each equipment have an installation position error (positional deviation) in the actual machine with respect to the ideal value in design, it is necessary to adjust the positional deviation each time when repairing. In order to measure the positional deviation in the actual machine using a sensor such as a camera, it is necessary to search for the sensor position and posture in which the positional deviation is detectable with a desired accuracy, and the reduction of the search man-hours is a problem to be solved.

As a method for automatically searching for the sensor position and posture, there is a technology described in JP-A 2016-99257 (Patent Literature 1). This publication describes that "there are provided computing means for computing each hidden area where the target object is obstructed when the target object is viewed from a plurality of viewpoints based on two-dimensional information or three-dimensional information acquired by sensor means in first position and posture; and determining means for determining second position and posture different from the first position and posture as position and posture of sensor means capable of acquiring three-dimensional information for measuring the position and posture of the target object based on the hidden area computed by the computing means".

In the method of Japanese Unexamined Patent Application Publication No. 2016-99257, the sensor position and posture are determined based on the computation result of the hidden area where the target object is obstructed, and the magnitude of the positional deviation of the target object viewed from the sensor position and posture is not computed. Therefore, for example, when the magnitude of the positional deviation of the target object acquired when viewed from the determined sensor position and posture is less than the threshold value that can be detected by the sensor, the positional deviation cannot be detected.

Further, the method of JP-A-2016-99257 determines single position and posture for measuring three-dimensional information of the target object. However, for example, a three-dimensional distance sensor such as a stereo camera acquires images with a plurality of cameras installed relatively close to each other, and calculates the distance to an imaging target based on the difference between images. In this case, the difference in the depth direction is hard to appear on the image, and thus the detection accuracy is low. At present, the detection accuracy in the depth direction is in the order of millimeters, and it is difficult to detect minute positional deviation of sub-millimeters or less from the single position and posture. Therefore, in order to detect a minute positional deviation of sub-millimeters or less, it is necessary to determine a plurality of positions and postures that are relatively far from each other.

SUMMARY OF THE INVENTION

Here, an object of the invention is to provide a technology for automatically determining a plurality of sensor positions and postures in which a positional deviation is detectable and reducing the man-hours for searching for the sensor position and posture for adjusting the positional deviation.

In order to solve at least one of the above-described problems, for example, the configuration described in the range of claims is adopted. The present application includes a plurality of means for solving the above-described problems, and one example thereof is an adjustment support system having an arithmetic unit and a storage unit, in which the storage unit stores sensor information including information on features of a sensor that captures an image of a target, and imaging target information including information on dimensions, shape, and disposition of an imaging target of the sensor, the arithmetic unit generates a plurality of candidates for an imaging position and an imaging posture of the imaging target by the sensor, and determines whether or not positional deviation of the imaging target in a plurality of directions is detectable from a captured image obtained by the sensor based on the sensor information and the imaging target information, with respect to each of the plurality of candidates for the imaging position and the imaging posture, and based on the result of the determination, determines one or more imaging positions and imaging postures for the sensor to actually capture an image of the imaging target from the plurality of candidates for the imaging position and the imaging posture.

According to one aspect of the invention, it is possible to automatically determine the plurality of sensor positions and postures in which the positional deviation is detectable, and it is possible to reduce the man-hours for adjusting the positional deviation.

The problems, configurations, and effects other than those described above will be apparent from the following description of the embodiments.

BRIEF DESCRIPTION OF THE DRAWINGS

FIG. 12 is a flowchart illustrating an example of a flow of processing executed by an error estimation unit according to Example 3 of the invention; and FIG. 13 is a flowchart illustrating an example of a flow of processing executed by a motion plan correction unit according to Example 3 of the invention.

DESCRIPTION OF EMBODIMENTS

Hereinafter, an adjustment support system and a device according to the invention will be described with reference to the drawings, based on the embodiments.

Example 1

Figure 1:
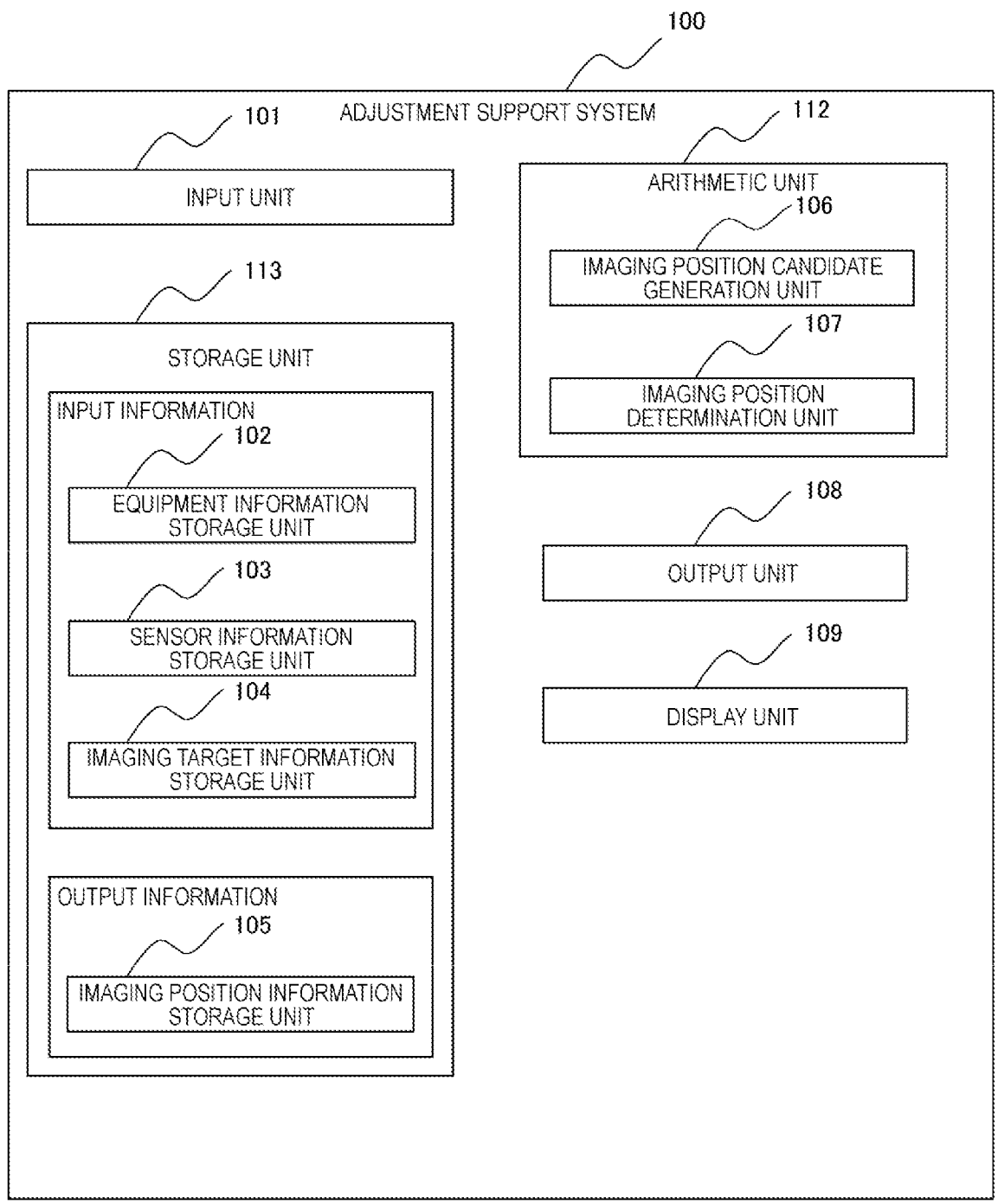
FIG. 1 is a block diagram illustrating an example of the overall configuration of an adjustment support system according to Example 1 of the invention.

FIG. 1 is a block diagram illustrating an example of the overall configuration of an adjustment support system according to Example 1 of the invention.

As illustrated in FIG. 1, an adjustment support system 100 includes an input unit 101, an equipment information storage unit 102, a sensor information storage unit 103, an imaging target information storage unit 104, an imaging position information storage unit 105, an imaging position candidate generation unit 106, an imaging position determination unit 107, an output unit 108, and a display unit 109.

Input information is input to the input unit 101. The equipment information storage unit 102 stores equipment information including information on external features such as dimensions, shape, and disposition of equipment. The sensor information storage unit 103 stores sensor information on features of a sensor, such as the number of pixels, the viewing angle, and the imaging distance of a sensor. The imaging target information storage unit 104 stores imaging target information including information on external features such as dimensions, shape, and disposition of the imaging target. The imaging position information storage unit 105 stores information such as position and posture of the sensor.

As will be described later, the sensor may be installed at the hand of the robot. In this case, the adjustment support system 100 may further store information on the features of the robot (for example, information indicating the position and posture that can be taken by the hand of the robot). Such information may be included in the sensor information, may be included in the equipment information, or may be stored independently of these.

The imaging position candidate generation unit 106 generates a plurality of candidates for the sensor position and posture. The imaging position determination unit 107 determines a plurality of combinations of sensor positions and postures, in which a positional deviation of an imaging target is detectable, from a plurality of imaging position candidates. The output unit 108 outputs the determined sensor position and posture. The display unit 109 outputs the determined sensor position and posture.

The adjustment support system 100 may be realized by a computer having, for example, an arithmetic unit 112 and a storage unit 113. In this case, the arithmetic unit 112 is a processor that executes the program stored in the storage unit 113, and the imaging position candidate generation unit 106 and the imaging position determination unit 107 are realized by the arithmetic unit 112 executing the program. In other words, in the following description, the processing executed by the imaging position candidate generation unit 106 and the imaging position determination unit 107 is realized, for example, by the arithmetic unit 112 executing the program.

Further, the storage unit 113 includes, for example, a main storage device such as a DRAM and an auxiliary storage device such as a hard disk drive or an SSD, and stores a program executed by the arithmetic unit 112 and data used for processing of the arithmetic unit 112. The equipment information storage unit 102, the sensor information storage unit 103, the imaging target information storage unit 104, and the imaging position information storage unit 105 are storage areas in the storage unit 113.

The input unit 101 may include, for example, an input device such as a keyboard, a pointing device, and various sensors. The type of sensor is not limited, but may be, for example, an optical camera or a three-dimensional scanner such as a so-called LIDAR. Otherwise, the input unit 101 may include a communication device (not illustrated) in which information is input via a network (not illustrated). The output unit 108 outputs the information obtained as a result of the processing of the arithmetic unit 112. For example, the output unit 108 may store the obtained information as output information in the storage unit 113, or may output the obtained information via the communication device. The display unit 109 displays the information obtained as a result of the processing of the arithmetic unit 112. For example, the display unit 109 may include a display device for displaying characters, drawings, and the like.

Figure 2:
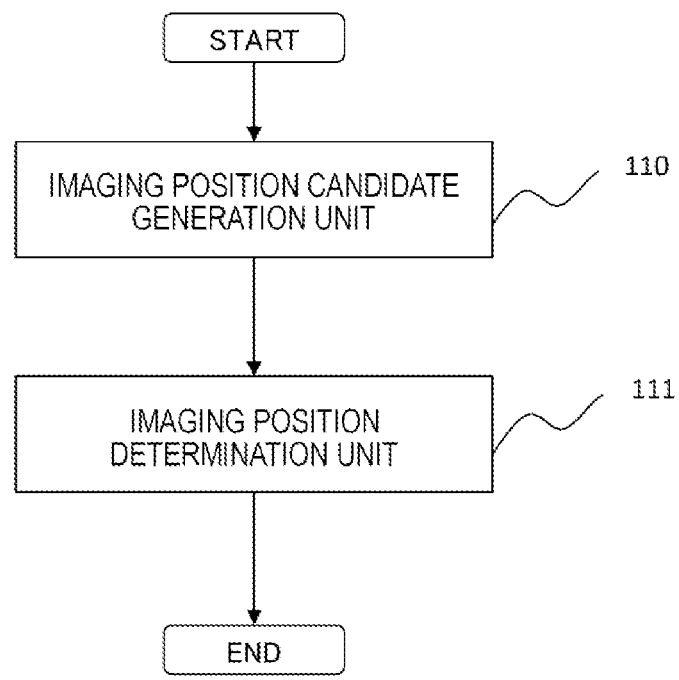
FIG. 2 is a flowchart illustrating an example of a flow of processing executed by the adjustment support system according to Example 1 of the invention.

FIG. 2 is a flowchart illustrating an example of a flow of processing executed by the adjustment support system 100 according to Example 1 of the invention.

Hereinafter, the flow of processing in the adjustment support system 100 will be described with reference to FIGS. 1 and 2.

<Imaging Position Candidate Generation Unit>

In the first procedure illustrated in FIG. 2, when the adjustment support system 100 starts processing, the imaging position candidate generation unit 106 generates a plurality of sensor position candidates for detecting the positional deviation of the imaging target by inputting the equipment information, the imaging target information, and the sensor information (step 110). The details of this processing will be described with reference to FIG. 3.

Figure 3:
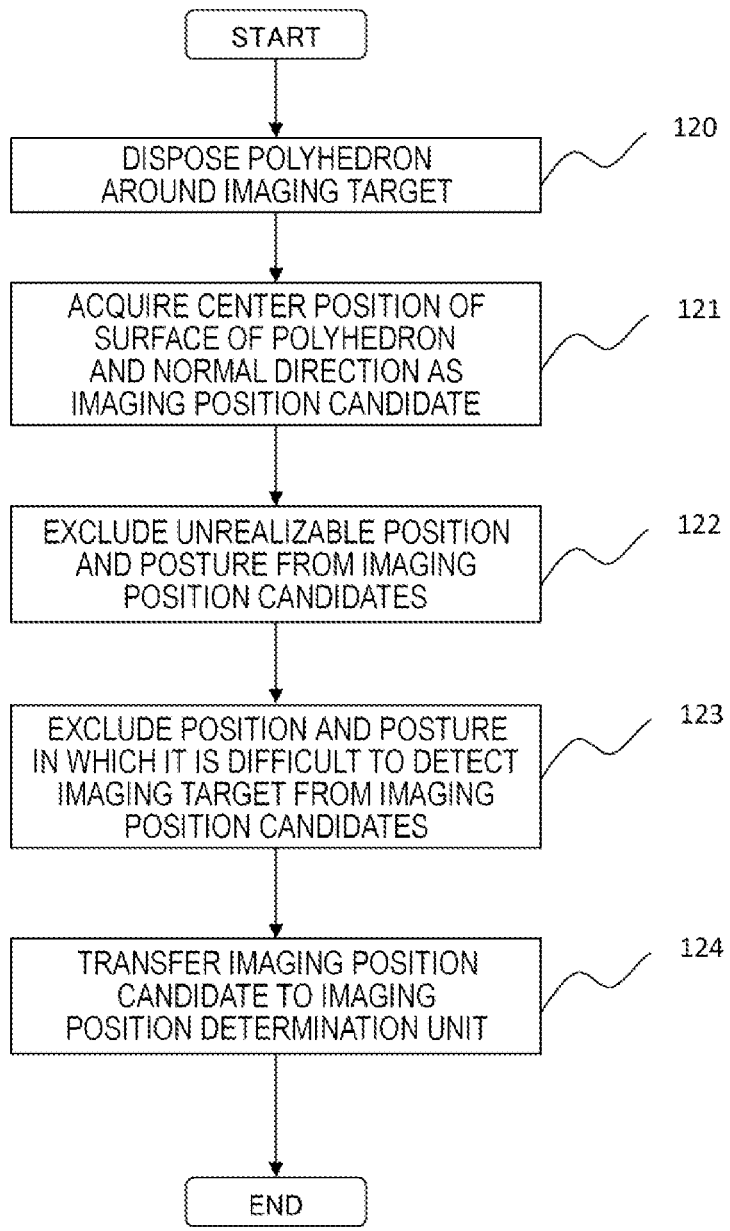
FIG. 3 is a flowchart illustrating an example of a flow of processing executed by an imaging position candidate generation unit according to Example 1 of the invention.

FIG. 3 is a flowchart illustrating an example of a flow of processing executed by the imaging position candidate generation unit 106 according to Example 1 of the invention.

In step 120, the imaging position candidate generation unit 106 disposes a virtual polyhedron around the imaging target. The imaging position candidate generation unit 106 disposes the polyhedron such that the distance between the center of each surface of the polyhedron and the imaging target matches the imaging distance stored in the sensor information storage unit 103. When the volume of the imaging target is large and the surface of the imaging target does not fit in the captured image, instead of the center of the imaging target, a point on the surface of the imaging target may be set as the center of the polyhedron. Further, a polyhedron is used in which the directions of the straight line connecting the center of each surface of the polyhedron and the imaging target match the directions of each surface normal line. As a polyhedron having such properties, for example, a regular polyhedron is known, but polyhedron may not be a regular polyhedron as long as the polyhedron has the same properties. Further, as long as the imaging target is included in the polyhedron, the imaging target does not necessarily have to be positioned at the center of the polyhedron.

The method of disposing the polyhedron as described above is an example of a method of generating candidates for the position and posture of the sensor for capturing an image of the imaging target from a plurality of directions, and candidates for the position and posture of the sensor may be generated so as to capture an image of the imaging target from the plurality of directions by the following method. For example, the candidates for the position and posture of the sensor may be generated by using only a part of the surfaces constituting the polyhedron. In step 121, the imaging position candidate generation unit 106 acquires the center position of each surface of the polyhedron and the normal direction of each surface. Then, the imaging position candidate generation unit 106 sets the acquired center position as the position of the sensor, the normal direction as the posture of the sensor, and the sensor position and posture corresponding to each surface as the imaging position candidate. Of the postures of the sensors, the rotation direction with the normal direction of each surface of the polyhedron as the rotation axis may be any determined value.

In step 122, the imaging position candidate generation unit 106 excludes unrealizable position and posture from the imaging position candidates acquired in step 121. The unrealizable position and posture are, for example, the position and posture that interfere with the equipment. When the sensor is installed in a robot or the like, the imaging position candidate generation unit 106 excludes postures, which is unrealizable by the robot, from the imaging position candidates.

In step 123, the imaging position candidate generation unit 106 excludes the position and posture, in which it is difficult to detect the imaging target, from the imaging position candidates. The position and posture in which it is difficult to detect the imaging target are, for example, the position and posture in which obstruction is generated by an object existing between the sensor and the imaging target. Further, the imaging position candidate generation unit 106 also excludes the position and posture, in which the contour of the imaging target is unclear, from the imaging position candidates due to the influence of shadows generated by the lighting.

Here, steps 122 and 123 are performed in order to reduce the processing time of the imaging position determination unit 107 in step 111 by excluding the imaging position candidates that are not suitable for the imaging position in advance.

In step 124, the imaging position candidate generation unit 106 transfers the remaining imaging position candidates that are not excluded to the imaging position determination unit 107, and ends the processing.

By the above processing, it is possible to automatically generate sensor position and posture candidates for capturing an image of the imaging target at a desired imaging distance.

<Imaging Position Determination Unit>

In the second procedure illustrated in FIG. 2, the imaging position determination unit 107 determines a plurality of sensor positions and postures for detecting the positional deviation of the imaging target (step 111). The details of this processing will be described with reference to FIG. 4.

Figure 4:
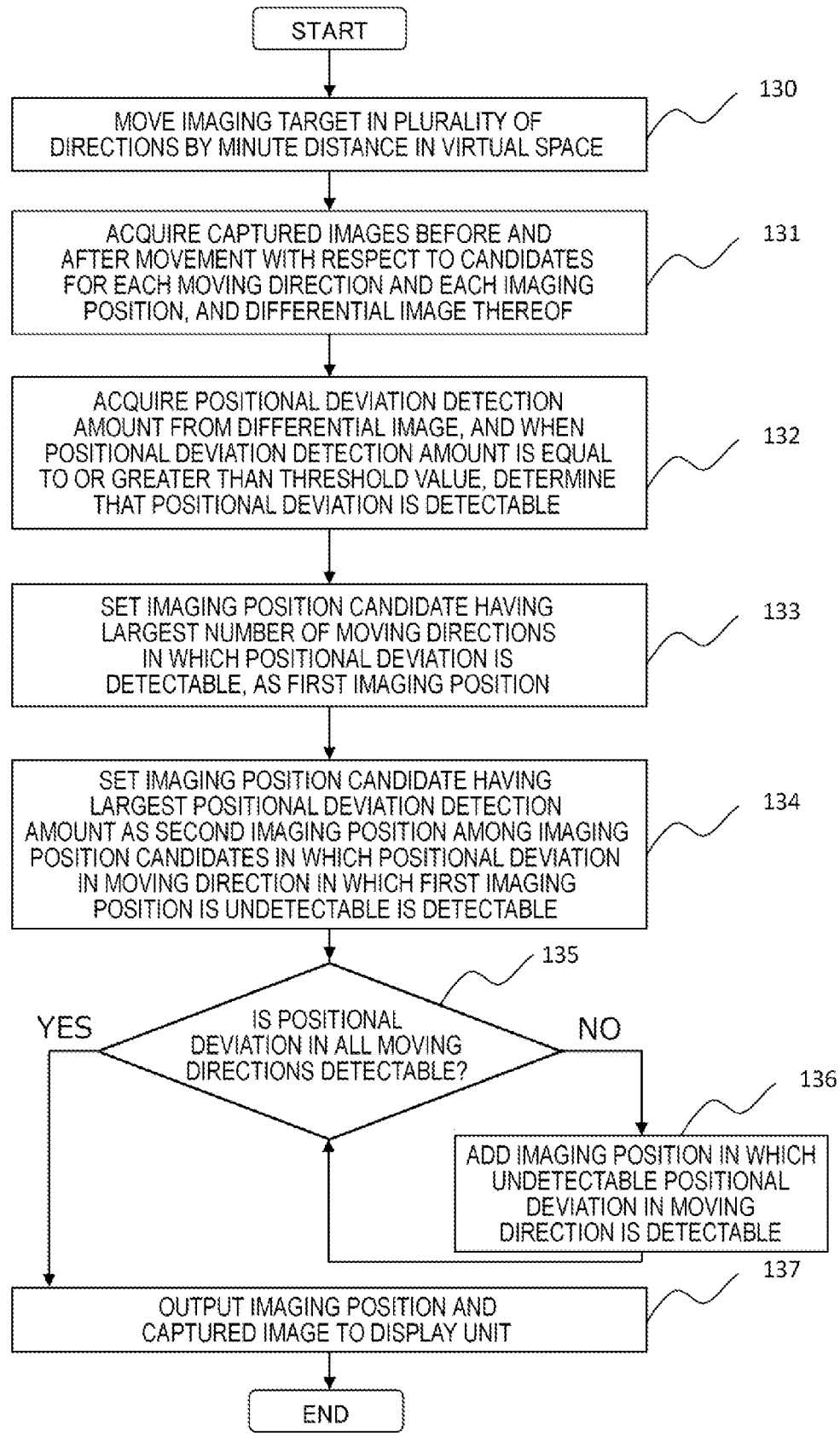
FIG. 4 is a flowchart illustrating an example of a flow of processing executed by an imaging position determination unit according to Example 1 of the invention.

FIG. 4 is a flowchart illustrating an example of a flow of processing executed by the imaging position determination unit 107 according to Example 1 of the invention.

In step 130, the imaging position determination unit 107 moves the imaging target in a plurality of directions by a minute distance in the virtual space based on the imaging target information stored in the imaging target information storage unit 104. The minute distance is, for example, a distance corresponding to the adjustment accuracy required for the positional deviation adjustment, and may be determined in advance.

In step 131, the imaging position determination unit 107 acquires an image of the imaging target captured by the sensor in each imaging position candidate generated in step 110. The image here is acquired in the virtual space based on the sensor information stored in the sensor information storage unit 103 and the imaging target information stored in the imaging target information storage unit 104. In other words, the captured image here is not obtained by capturing an image of the imaging target by the sensor in the actual space, but is acquired by calculating the image supposed to be obtained when captured by the sensor in the position and posture according to each imaging position candidate based on the sensor information and the imaging target information. Acquisition of an image, which is the imaging target, by such calculation is also described as capturing an image in a virtual space.

The capturing of an image in the virtual space is executed before and after the movement of the imaging target by a minute distance in step 130. The imaging position determination unit 107 uses the image before the movement as a reference image and the image after the movement as a shift image, and acquires a differential image between the reference image and the shift image. The differential image is an image obtained when, for example, background subtraction processing is applied.

In step 132, the imaging position determination unit 107 acquires the positional deviation detection amount from the differential image acquired in step 131, and when the positional deviation detection amount is equal to or greater than the threshold value, it is determined that the positional deviation in the moving direction is detectable in the imaging position. Here, the positional deviation detection amount is information representing the magnitude of the positional deviation viewed from a sensor placed in a certain posture in a certain position, such as the line width and pixel angle of a differential image. Further, as the threshold value used at the time of determination, for example, the minimum detection pixel angle or the like determined by the specifications of the sensor is used.

In step 133, the imaging position determination unit 107 performs determination in step 132 with respect to all combinations of imaging position candidates and moving directions, and then sets the imaging position candidate having the largest number of moving directions in which the positional deviation is detectable as a first imaging position.

In step 134, the imaging position determination unit 107 sets the imaging position candidate having the largest positional deviation detection amount as a second imaging position, among the imaging position candidates in which the positional deviation in the moving direction, in which the first imaging position is undetectable, is detectable.

In step 135, the imaging position determination unit 107 determines whether or not the positional deviation detection amount is equal to or greater than the threshold value with respect to all the moving directions generated in step 130 according to the first imaging position and the second imaging position. When the determination result is detectable (YES), the process proceeds to step 137, and when the determination result is undetectable (NO), the process proceeds to step 136.

In step 136, the imaging position determination unit 107 adds an imaging position candidate in which the positional deviation in the moving direction, which is undetectable from all the imaging positions determined up to step 135, is detectable, to the imaging position. The imaging position determination unit 107 repeats this processing until the positional deviation in all the moving directions generated in step 130 becomes detectable.

In step 137, the determined imaging position information, the captured image of the imaging target in the imaging position, the positional deviation detection amount, and the like are output to the display unit 109.

Figure 5:
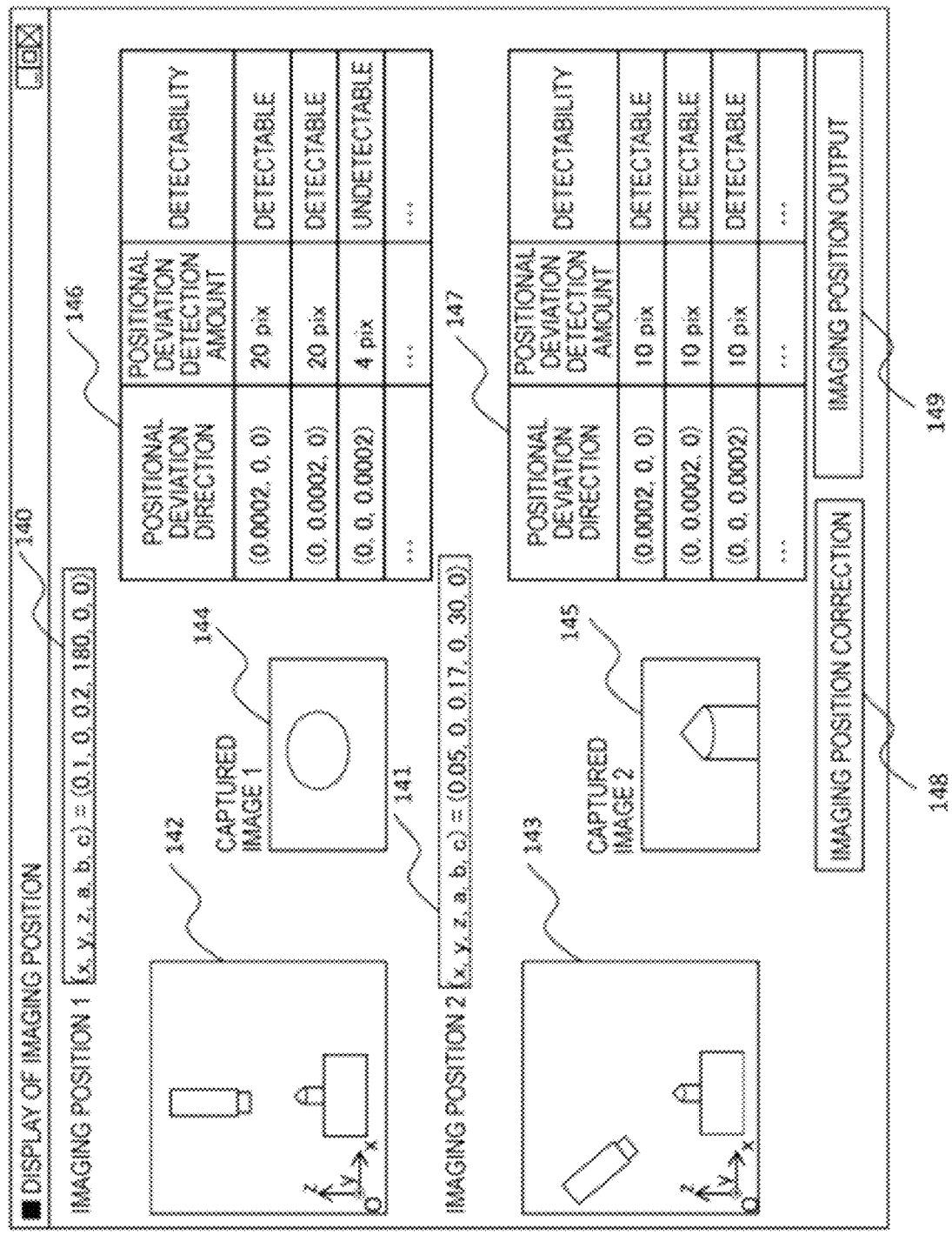
FIG. 5 is an explanatory diagram illustrating an example of imaging position information displayed on a display unit according to Example 1 of the invention.

FIG. 5 is an explanatory diagram illustrating an example of imaging position information displayed on the display unit 109 according to Example 1 of the invention.

For example, the display unit 109 may output information as illustrated in FIG. 5.

The coordinates 140 and 141 are coordinates representing the first imaging position and coordinates representing the second imaging position, respectively. In this description, the imaging position is represented using x, y, and z representing the position in the rectangular coordinate system and a, b, and c representing the posture by the rotation amount of the coordinate axes, but other coordinate systems such as a cylindrical coordinate system, for example, and other posture expressions such as quaternions may be used.

An image 142 is an image composed of the positional relationship between the sensor, the imaging target, and the equipment at the first imaging position based on the imaging target information stored in the imaging target information storage unit 104 and the equipment information stored in the equipment information storage unit 102. Similarly, an image 143 is an image composed of the positional relationship between the sensor, the imaging target, and the equipment at the second imaging position based on the imaging target information stored in the imaging target information storage unit 104 and the equipment information stored in the equipment information storage unit 102.

Images 144 and 145 are the reference image of the imaging target viewed from the first imaging position and the reference image of the imaging target viewed from the second imaging position, which are respectively acquired in step 131.

A table 146 is a table in which information such as the positional deviation detection amount and detectability at the first imaging position, which was acquired in step 132, is described. Similarly, a table 147 is a table in which information such as the positional deviation detection amount and detectability at the second imaging position, which was acquired in step 132, is described.

When there is a problem with the imaging position, the user of the adjustment support system 100 can correct the numerical values of the imaging position coordinates 140 and 141 by directly inputting the numerical values by operating a button 148 via the input unit 101. The imaging position determination unit 107 can execute the processing of step 131 and step 132 again based on the corrected imaging position, and confirm the positional deviation detection amount and the positional deviation detectability.

When there is no problem with the imaging position, and when the user operates a button 149, the output unit 108 outputs the imaging position information to the imaging position information storage unit 105 and ends the processing.

Figure 6:
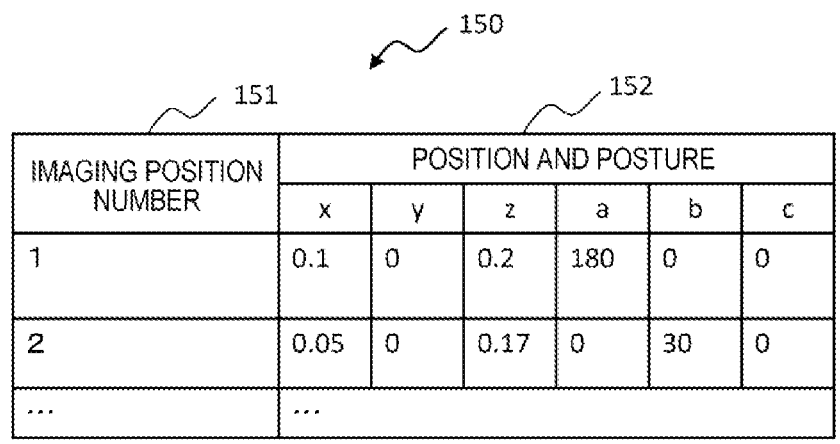
FIG. 6 is an explanatory diagram illustrating an example of imaging position information stored in an imaging position information storage unit according to Example 1 of the invention.

FIG. 6 is an explanatory diagram illustrating an example of the imaging position information stored in the imaging position information storage unit 105 according to Example 1 of the invention.

A table 150 has an imaging position number field 151 and a position and posture field 152.

In the imaging position number field 151, a number for identifying the imaging position is stored.

The position and posture field 152 stores the coordinates of the determined imaging position and information indicating the posture of the sensor in the imaging position.

In this description, the imaging position number and the position and posture are described as the imaging position information, but necessary information may be added or removed, and the invention does not limit the information to be described.

As described above, according to this example, it is possible to automatically determine the positions and postures of the plurality of sensors in which the positional deviation is detectable, and it is possible to reduce the man-hours for adjusting the positional deviation.

Example 2

Next, Example 2 of the invention will be described. In this example, a system that generates an imaging motion program of the robot based on the imaging position information when the positional deviation is detected by a sensor installed at the hand of the robot will be described. Except for the differences described below, each unit of the system of Example 2 has the same functions as those of each unit having the same reference numeral of Example 1 illustrated in FIGS. 1 to 6, and thus the description thereof will be omitted.

Figure 7:
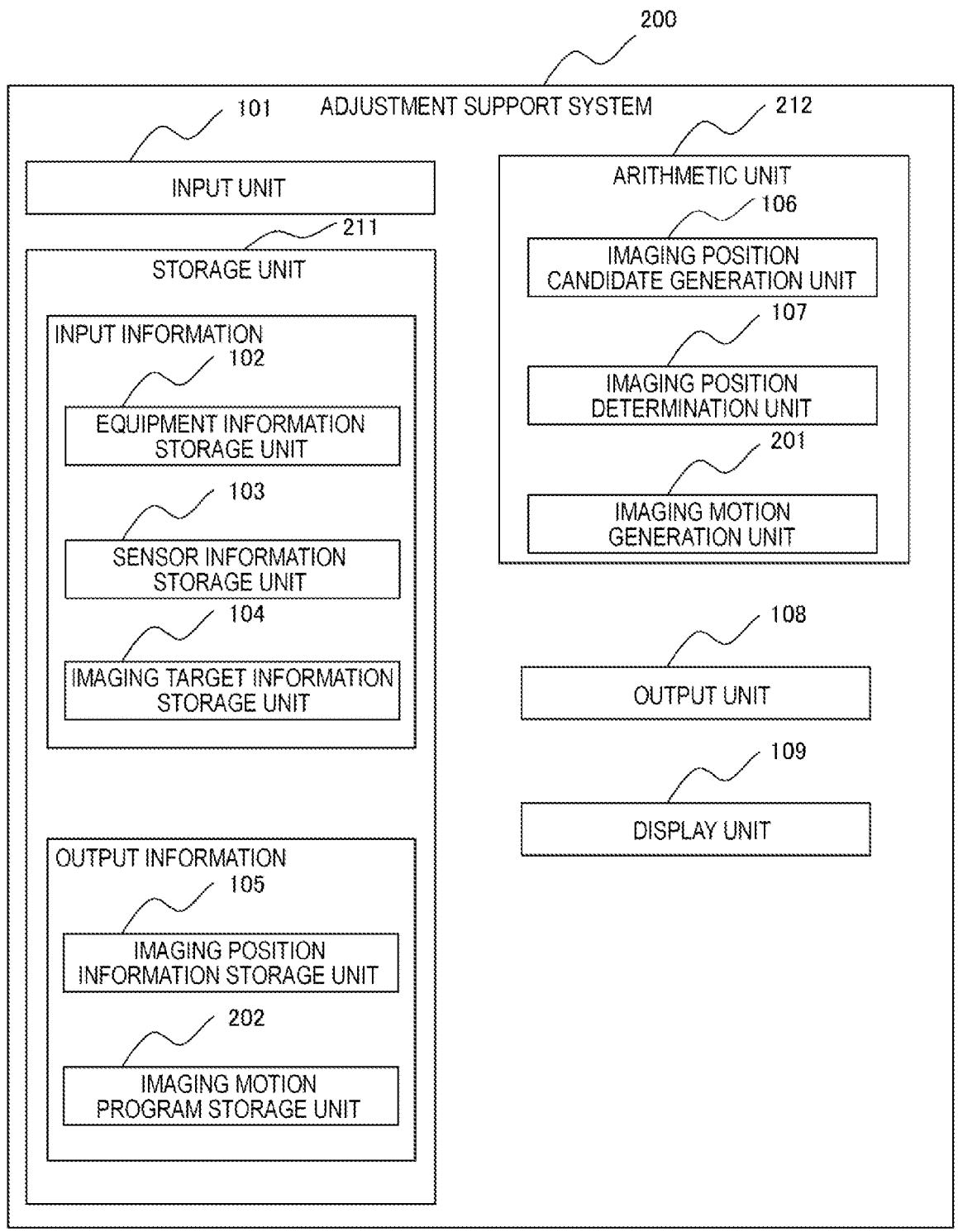
FIG. 7 is a block diagram illustrating an example of the overall configuration of an adjustment support system according to Example 2 of the invention.

FIG. 7 is a block diagram illustrating an example of the overall configuration of an adjustment support system according to Example 2 of the invention.

In an adjustment support system 200 of Example 2 illustrated in FIG. 7, the parts that are not different from the adjustment support system 100 illustrated in FIG. will be omitted. As a difference from FIG. 1, the adjustment support system 200 includes an arithmetic unit 212 and a storage unit 211. The arithmetic unit 212 includes an imaging motion generation unit 201 in addition to the imaging position candidate generation unit 106 and the imaging position determination unit 107, which are illustrated in FIG. 1. The storage unit 211 includes an imaging motion program storage unit 202 in addition to each of the storage units 102 to 105 illustrated in FIG. 1.

The imaging motion generation unit 201 generates a motion program in which the robot moves to each imaging position and captures images based on the imaging position information stored in the imaging position information storage unit 105. This is realized, for example, by the arithmetic unit 212 executing the program stored in the storage unit 211.

The imaging motion program storage unit 202 stores the robot motion program generated by the imaging motion generation unit 201.

Figure 8:
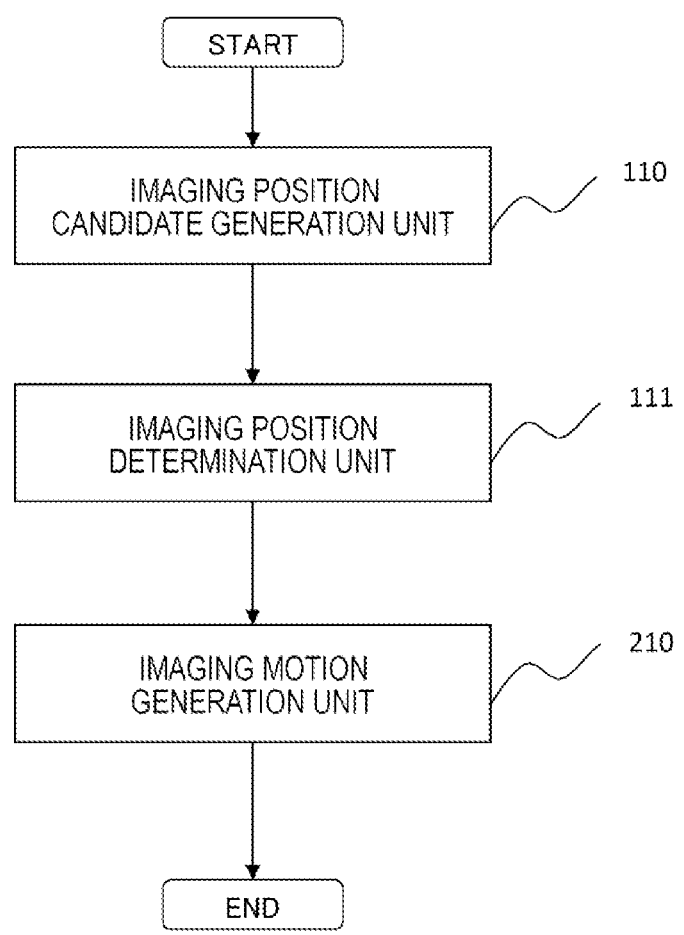
FIG. 8 is a flowchart illustrating an example of a flow of processing executed by the adjustment support system according to Example 2 of the invention.

FIG. 8 is a flowchart illustrating an example of a flow of processing executed by the adjustment support system 200 according to Example 2 of the invention. Hereinafter, the flow of processing in the adjustment support system 200 will be described with reference to FIGS. 7 and 8.

Since the first procedure and the second procedure illustrated in FIG. 8 are not different from the first procedure (step 110) and the second procedure (step 111) illustrated in FIG. 2, the description thereof will be omitted.

In the third procedure illustrated in FIG. 8, the imaging motion generation unit 201 moves the sensor installed at the hand of the robot to each imaging position and generates a motion program for capturing an image (step 210). The details of this processing will be described with reference to FIG. 9.

Figure 9:
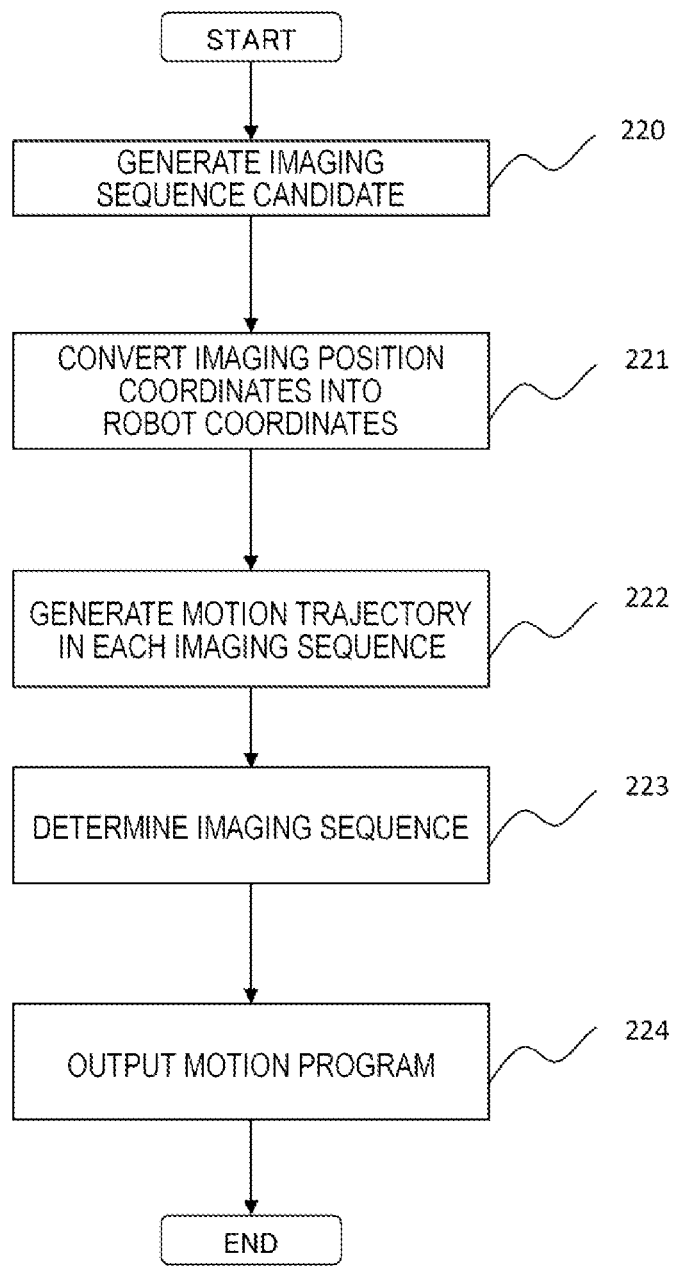
FIG. 9 is a flowchart illustrating an example of a flow of processing executed by an imaging motion generation unit according to Example 2 of the invention.

FIG. 9 is a flowchart illustrating an example of a flow of processing executed by the imaging motion generation unit 201 according to Example 2 of the invention.

In step 220, the imaging motion generation unit 201 generates a plurality of imaging sequence candidates in which the imaging position number fields 151 in FIG. 6 are rearranged.

In step 221, the imaging motion generation unit 201 converts the sensor position and posture described in the position and posture field 152 in FIG. 6 into the position and posture in the robot coordinate system.

In step 222, the imaging motion generation unit 201 generates a motion trajectory of the robot that moves to the imaging position according to the sequence for each imaging sequence candidate generated in step 220. For the generation of the motion trajectory, a trajectory planning method such as rapidly exploring random tree (RRT) is used.

In step 223, the imaging motion generation unit 201 determines one imaging sequence from each imaging sequence candidate. As the criterion for determination, for example, the criterion of selecting the motion trajectory with the shortest motion time may be used among the motion trajectories generated in step 222, but other criteria may be used.

In step 224, the imaging motion generation unit 201 outputs the motion trajectory corresponding to the determined imaging sequence as the robot motion program, stores the motion trajectory in the imaging motion program storage unit 202, and ends the processing.

As described above, according to this example, after automatically determining the plurality of sensor positions and postures in which the positional deviation is detectable, it is possible to automatically generate a motion program for the robot to perform an imaging motion, and it is possible to reduce the man-hours for adjusting the positional deviation.

Example 3

Next, Example 3 of the invention will be described. In this example, a system that detects the positional deviation with a sensor installed at the hand of the robot and corrects the motion plan of the robot based on the estimated positional deviation amount will be described. Except for the differences described below, each unit of the system of Example 3 has the same functions as those of each unit having the same reference numeral of Examples 1 or 2 illustrated in FIGS. 1 to 9, and thus the description thereof will be omitted.

Figure 10:
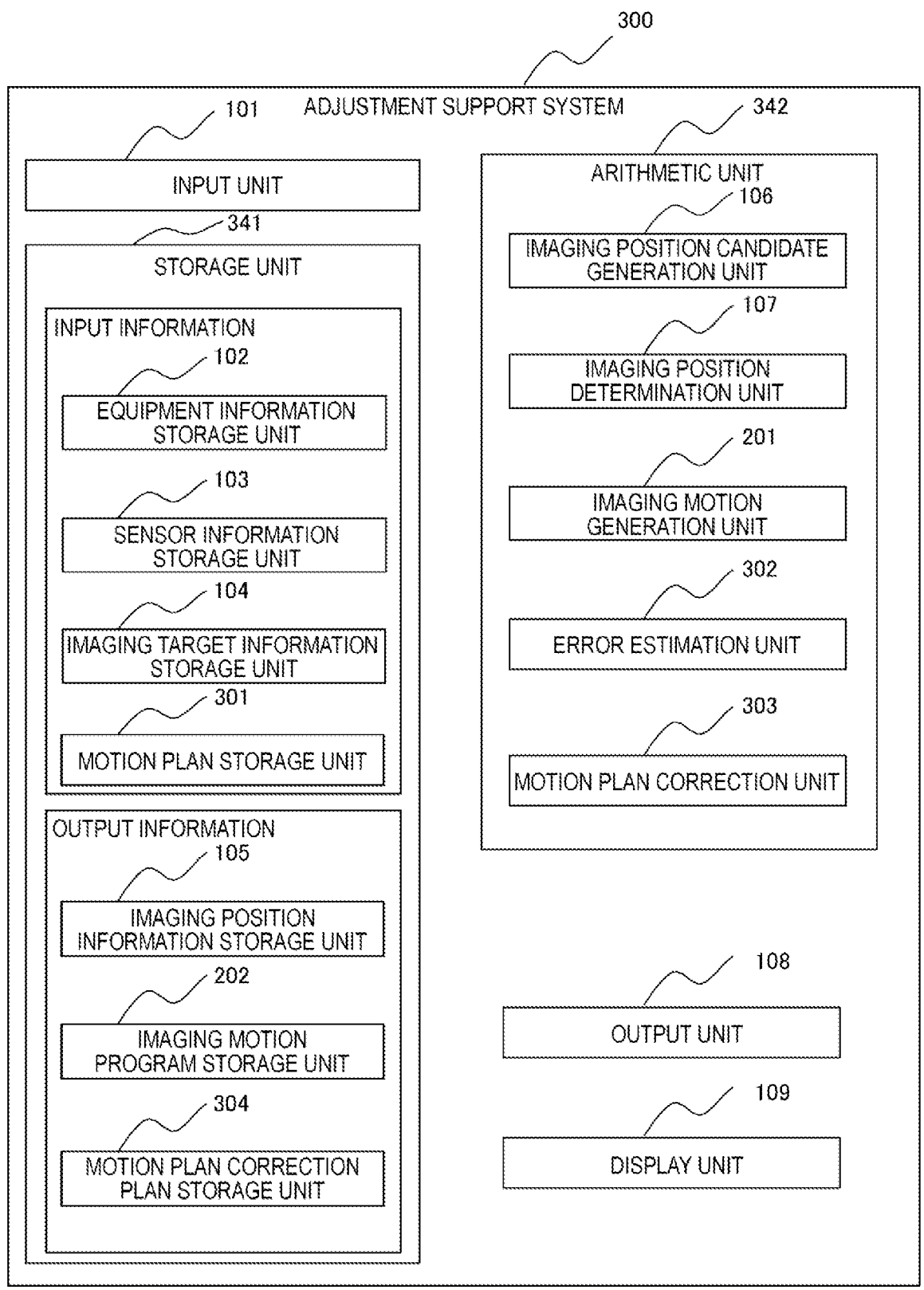
FIG. 10 is a block diagram illustrating an example of the overall configuration of an adjustment support system according to Example 3 of the invention.

FIG. 10 is a block diagram illustrating an example of the overall configuration of an adjustment support system according to Example 3 of the invention.

In an adjustment support system 300 of Example 3 illustrated in FIG. 10, the description of the parts that are not different from the adjustment support system 100 illustrated in FIG. 1 and the adjustment support system 200 illustrated in FIG. 7 will be omitted. As a difference from FIG. 7, the adjustment support system 300 includes an arithmetic unit 342 and a storage unit 341. The arithmetic unit 342 includes an error estimation unit 302 and a motion plan correction unit 303 in addition to the imaging position candidate generation unit 106, the imaging position determination unit 107, and the imaging motion generation unit 201, which are illustrated in FIG. 7. The storage unit 341 includes a motion plan storage unit 301 and a motion plan correction plan storage unit 304 in addition to each of the storage units 102 to 105 and 202 illustrated in FIG. 7.

The motion plan storage unit 301 stores a motion plan that defines a series of motions of the robot such as picking or welding in the form of a motion program or the like.

The error estimation unit 302 estimates the positional deviation amount of the imaging target based on the image captured based on the imaging motion program stored in the imaging motion program storage unit 202.

The motion plan correction unit 303 corrects the motion plan of the robot stored in the motion plan storage unit 301 based on the positional deviation amount of the imaging target estimated by the error estimation unit 302.

The processing of the error estimation unit 302 and the motion plan correction unit 303 is realized, for example, by the arithmetic unit 342 executing the program stored in the storage unit 341.

The motion plan correction plan storage unit 304 stores the motion plan of the robot corrected by the motion plan correction unit 303 in the form of a motion program or the like.

Figure 11:
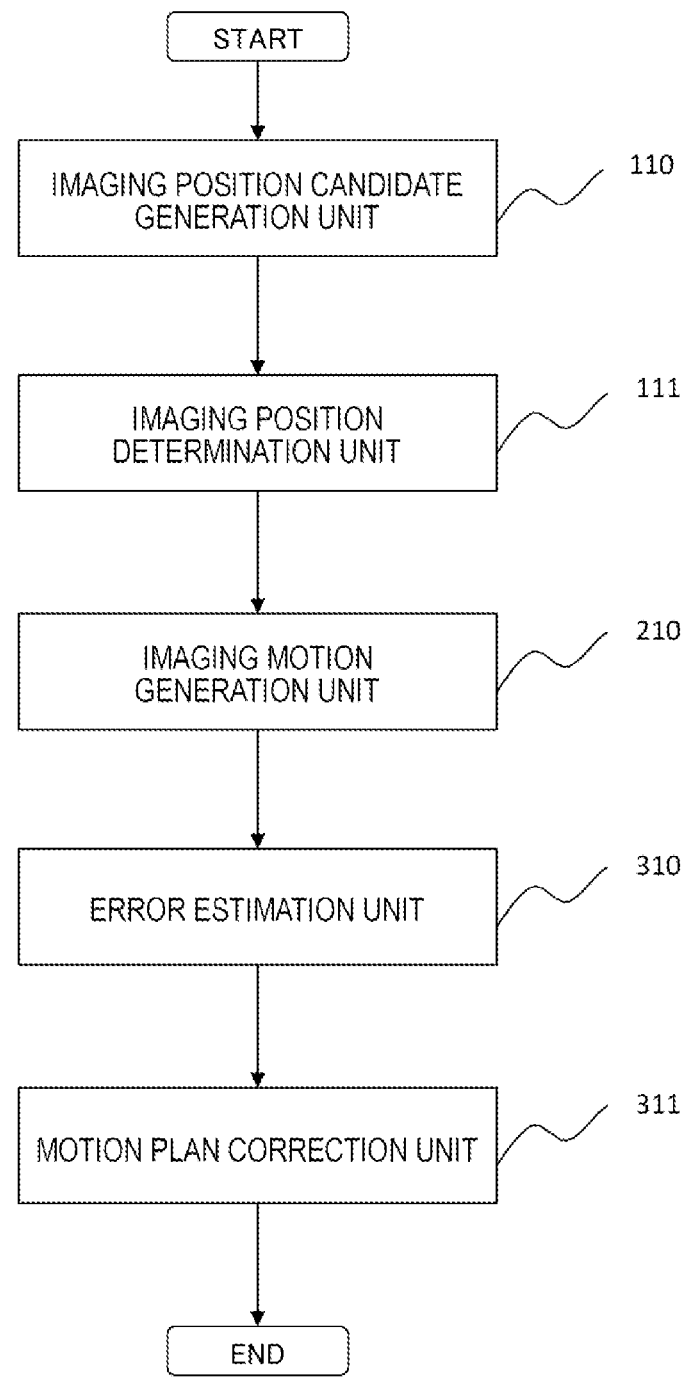
FIG. 11 is a flowchart illustrating an example of a flow of processing executed by the adjustment support system according to Example 3 of the invention.

FIG. 11 is a flowchart illustrating an example of a flow of processing executed by the adjustment support system 300 according to Example 3 of the invention. Hereinafter, the flow of processing in the adjustment support system 300 will be described with reference to FIGS. 10 and 11.

Since the first procedure and the second procedure illustrated in FIG. 11 are not different from the first procedure (step 110) and the second procedure (step 111) illustrated in FIG. 2, the description thereof will be omitted. Further, since the third procedure illustrated in FIG. 11 is not different from the third procedure (step 210) illustrated in FIG. 8, the description thereof will be omitted.

<Error Estimation Unit>

In the fourth procedure illustrated in FIG. 11, the error estimation unit 302 captures an image of the imaging target from a plurality of imaging positions according to the imaging motion program, and estimates the positional deviation amount of the imaging target (step 310). The details of this processing will be described with reference to FIG. 12.

FIG. 12 is a flowchart illustrating an example of a flow of processing executed by the error estimation unit 302 according to Example 3 of the invention.

In step 320, the error estimation unit 302 executes the imaging motion program stored in the imaging motion program storage unit 202 and acquires the captured image which is an imaging target. Accordingly, an image obtained by capturing an image of the imaging target by the sensor in the actual space is acquired.

In step 321, the error estimation unit 302 compares the captured image acquired in step 320 with the reference image acquired in step 131 to estimate the positional deviation amount of the imaging target.

The positional deviation amount can be estimated, for example, by extracting the feature amount of the imaging target from the image and measuring the difference in the feature amount between the reference image and the captured image. As the feature amount, for example, a pixel position in which a characteristic shape of the imaging target appears, a contour line of the imaging target, or the like may be used. Otherwise, a known feature amount such as scale-invariant feature transform (SIFT) feature amount or speeded-up robust features (SURF) feature amount may be used. Further, the error estimation unit 302 may acquire a shift image by generating various positional deviations in the virtual space in advance, and extract the feature amount or estimate the positional deviation amount using a technology such as a neural network or machine learning using the shift image as learning data.

In step 322, the error estimation unit 302 transfers the positional deviation amount estimated in step 321 to the motion plan correction unit 303, and ends the processing.

By the above processing, the positional deviation amount of the imaging target can be automatically estimated from the captured image.

<Motion Plan Correction Unit>

In the fifth procedure illustrated in FIG. 11, the motion plan correction unit 303 captures an image of the imaging target from a plurality of imaging positions according to the imaging motion program, and estimates the positional deviation amount of the imaging target (step 311). The details of this processing will be described with reference to FIG. 13.

FIG. 13 is a flowchart illustrating an example of a flow of processing executed by the motion plan correction unit 303 according to Example 3 of the invention.

In step 330, the motion plan correction unit 303 reflects the positional deviation amount of the imaging target estimated by the error estimation unit 302 in the imaging target information stored in the imaging target information storage unit 104, and disposes the imaging target in the virtual space. Here, reflecting the positional deviation amount in the imaging target information means that, for example, processing of adding 0.2 mm to the x coordinate of the imaging target information and adding 0.5° to the a coordinate, when the positional deviation amount is 0.2 mm in the x direction and 0.5° in the a direction.

In step 331, the motion plan correction unit 303 corrects the motion plan in the virtual space in which the positional deviation is reflected. For example, when the motion plan stored in the motion plan storage unit 301 is a picking motion of the robot and the imaging target is a picking target component, the motion plan correction unit 303 substitutes the positional deviation amount estimated by the error estimation unit 302 into the robot coordinates representing the picking position in the motion program as a correction value, and in a state where the positional deviation of the picking target component in the virtual space is corrected by the processing of step 330, the motion trajectory of the robot for picking the component is generated. Here, a known trajectory planning method such as RRT may be used to generate the motion trajectory.

In step 332, the motion plan correction unit 303 outputs the corrected motion plan to the motion plan correction plan storage unit, and ends the processing.

As described above, according to this example, the sensor installed in the robot can automatically detect and estimate the positional deviation, and correct the motion program, and can reduce the man-hours for adjusting the positional deviation.

Further, the system of the embodiment of the invention may be configured as follows.

(1) There is provided an adjustment support system (for example, the adjustment support system 100, 200, or 300) having an arithmetic unit (for example, the arithmetic unit 112, 212, or 342) and a storage unit (for example, the storage unit 113, 211, or 331), in which the storage unit stores sensor information (for example, the sensor information stored in the sensor information storage unit 103) including information on features of a sensor that captures an image of a target, and imaging target information (for example, the imaging target information stored in the imaging target information storage unit 104) including information on dimensions, shape, and disposition of an imaging target of the sensor, and the arithmetic unit generates a plurality of candidates for an imaging position and an imaging posture of the imaging target by the sensor (for example, step 110), and determines whether or not positional deviation of the imaging target in a plurality of directions is detectable from a captured image obtained by the sensor based on the sensor information and the imaging target information, with respect to each of the plurality of candidates for the imaging position and the imaging posture, and based on the result of the determination, determines one or more imaging positions and imaging postures for the sensor to actually capture an image of the imaging target from the plurality of candidates for the imaging position and the imaging posture (for example, step 111).

Accordingly, it is possible to automatically determine the plurality of sensor positions and postures in which the positional deviation is detectable, and it is possible to reduce the man-hours for adjusting the positional deviation.

(2) In the above-described (1), the arithmetic unit sets a center of each surface of a polyhedron containing the imaging target as a candidate for the imaging position, and sets the posture for capturing an image of each surface in a normal direction as a candidate for the imaging posture, to generate a plurality of candidates for the imaging position and the imaging direction (for example, step 121).

Accordingly, it is possible to generate appropriate sensor position and posture candidates such that the positional deviations in more directions are detectable.

(3) In the above-described (1), the arithmetic unit calculates images obtained when the sensor captured images before and after moving the imaging target by a predetermined distance in each of the plurality of directions, with respect to each of the plurality of candidates for the imaging position and the imaging posture, based on the sensor information and the imaging target information, and when a line width of a differential image of images before and after the movement by the predetermined distance exceeds a predetermined threshold value, the arithmetic unit determines that the positional deviation in the direction is detectable (for example, steps 130 to 132).

Accordingly, it is possible to determine the sensor position and posture in which the positional deviation is detectable.

(4) In the above-described (1), the arithmetic unit specifies the number of directions in which the positional deviation is detectable based on the captured image obtained by the sensor among the positional deviations of the imaging target by the predetermined distance in the plurality of directions, with respect to each of the plurality of candidates for the imaging position and the imaging posture, and based on the number of directions in which the positional deviation is detectable, the arithmetic unit determines the one or more imaging positions and imaging postures for the sensor to actually capture an image of the imaging target (for example, step 134).

Accordingly, it is possible to determine the sensor position and posture in which the positional deviations in more directions are detectable.

(5) In the above-described (4), the arithmetic unit determines the one or more imaging positions and imaging postures for the sensor to actually capture an image of the imaging target such that all the positional deviations by the predetermined distance in the plurality of directions are detectable (for example, steps 134 to 136).

Accordingly, it is possible to determine the sensor position and posture in which the expected positional deviations in all directions are detectable.

(6) In the above-described (4), the arithmetic unit determines a candidate having the largest number of directions in which the positional deviation is detectable as one candidate for the one or more imaging positions and imaging postures for the sensor to actually capture an image of the imaging target, among the plurality of candidates for the imaging position and the imaging posture (for example step 134).

Accordingly, it is possible to determine the sensor position and posture in which the positional deviations in more directions are detectable.

(7) In the above-described (6), the arithmetic unit specifies a direction in which positional deviation is undetectable based on the images captured in the imaging position and the imaging posture determined as the imaging position and the imaging posture among the plurality of candidates for the imaging position and the imaging posture, and adds a candidate for the imaging position and the imaging posture in which the positional deviation in the specified direction is detectable as one of the imaging positions and imaging postures for the sensor to actually capture an image of the imaging target (for example, steps 134 to 136).

Accordingly, it is possible to determine the sensor position and posture in which the expected positional deviations in all directions are detectable.

(8) In the above-described (1), the arithmetic unit outputs information indicating the one or more imaging positions and imaging postures for the sensor to actually capture an image of the imaging target (for example, step 137, FIG. 5), and corrects the one or more imaging positions and imaging postures for the sensor to actually capture an image of the imaging target according to the input information when information on correction of at least one of the one or more imaging positions and imaging postures for the sensor to actually capture an image of the imaging target is input.

Accordingly, it is possible to reflect the knowledge of the user in the detection of the positional deviation.

(9) In the above-described (1), the sensor is installed in a robot, and the arithmetic unit creates a robot program for sequentially moving the sensor according to the one or more imaging positions and imaging postures for the sensor to actually capture an image of the imaging target, and stores the robot program in the storage unit (for example, step 210).

Accordingly, after automatically determining the plurality of sensor positions and postures in which the positional deviation is detectable, it is possible to automatically generate a motion program for the robot to perform an imaging motion, and it is possible to reduce the man-hours for adjusting the positional deviation.

(10) In the above-described (9), the arithmetic unit determines a sequence of moving the sensor according to the one or more imaging positions and imaging postures for the sensor to actually capture an image of the imaging target such that the motion time of the robot is minimized (for example, step 220), and creates the robot program according to a determined sequence (for example, steps 221 to 224).

Accordingly, it is possible to improve the work efficiency of the positional deviation adjustment.

(11) In the above-described (1), the storage unit further stores a motion plan (for example, the motion plan stored in the motion plan storage unit 301) of the robot for work in equipment including the imaging target, and the arithmetic unit estimates a positional deviation amount of the imaging target by comparing the image actually captured by the sensor at the one or more imaging positions and imaging postures for the sensor to actually capture an image of the imaging target, with the result of calculating the image obtained when captured by the sensor at the one or more imaging positions and imaging postures for the sensor to actually capture an image of the imaging target based on the sensor information and the imaging target information (for example, step 310), corrects the motion plan of the robot based on the estimated positional deviation amount (for example, step 311), and stores the corrected motion plan of the robot in the storage unit (for example, the motion plan stored in the motion plan correction plan storage unit 304).

Accordingly, the sensor installed in the robot can automatically detect and estimate the positional deviation, and correct the motion program, and can reduce the man-hours for adjusting the positional deviation.

(12) In the above-described (1), the storage unit further stores equipment information (for example, the equipment information stored in the equipment information storage unit 102) including information on dimensions, shape, and disposition of the equipment including the imaging target, and the arithmetic unit excludes the imaging position and the imaging posture in which it is not possible to capture an image of the imaging target due to interference with the equipment, from the plurality of candidates for the imaging position and the imaging posture, based on the equipment information (for example, step 122).

Accordingly, the positions and postures that cannot be actually adopted are excluded from the candidates, and work efficiency is improved.

(13) In the above-described (1), the sensor is installed at a hand of the robot, the storage unit further stores information indicating features of the robot, and the arithmetic unit excludes the imaging position and imaging posture that are unrealizable by the robot, from the plurality of candidates for the imaging positions and imaging postures, based on information indicating the features of the robot (for example, step 122).

Accordingly, the positions and postures that cannot be actually adopted are excluded from the candidates, and work efficiency is improved.

(14) In the above-described (1), the sensor is a camera, and the imaging target is a positioning pin for installing a work object in equipment.

Accordingly, it is possible to reduce the man-hours for adjusting the positional deviation when repairing the equipment in the manufacturing line.

In addition, the invention is not limited to the above-described examples, and includes various modification examples. For example, the above-described examples are examples which are described in detail in order to make it easy to understand the invention, and are not limited to a case where all of the described configurations are necessarily provided. In addition, a part of the configuration of a certain example can be replaced with the configuration of other examples, and the configuration of the other examples can be added to the configuration of a certain example. Further, it is also possible to add, remove, or replace other configurations with a part of the configuration of each example.

In addition, each of the above-described configurations, functions, processing units, processing means, and the like may be realized by hardware, for example, by designing a part or all of these with an integrated circuit or the like. Further, each of the above-described configurations, functions, and the like may be realized by software by interpreting and executing a program realized by each function of the processor. Information such as programs, tables, and files that realize each function can be stored in a storage device such as a non-volatile semiconductor memory, a hard disk drive, and a solid state drive (SSD), or a computer-readable non-temporary data storage medium such as an IC card, an SD card, and a DVD.

In addition, the control lines or the information lines indicate what is considered to be necessary for the description, and all the control lines or information lines in the product are not necessarily illustrated. It may be considered that almost all the configurations are actually connected to each other.

What is claimed is:

1. A system for creating a robot program based on a plurality of sensor positions and postures, the system comprising:
    a communication interface that is communicatively coupled to a sensor that is installed on a robot;
    a memory that stores sensor information including information on features of the sensor that captures an image of a target, and imaging target information including information on dimensions, shape, and disposition of an imaging target of the sensor, and
    a processor that is communicatively coupled to the memory and the communication interface, wherein the processor is configured to:
        generate a plurality of candidates for an imaging position and an imaging posture of the imaging target by the sensor,
        determine whether or not positional deviation of the imaging target in a plurality of directions is detectable from a captured image obtained by the sensor based on the sensor information and the imaging target information, with respect to each of the plurality of candidates for the imaging position and the imaging posture,
        determine one or more imaging positions and imaging postures for the sensor to actually capture an additional image of the imaging target from the plurality of candidates for the imaging position and the imaging posture,
        obtain images from the sensor obtained before and after moving the imaging target by a predetermined distance in each of the plurality of directions, with respect to each of the plurality of candidates for the imaging position and the imaging posture, based on the sensor information and the imaging target information,
        determine that the positional deviation in the direction is detectable when a line width of a differential image of the images before and after movement by the predetermined distance exceeds a predetermined threshold value,
        create the robot program for sequentially moving the sensor according to the one or more imaging positions and the imaging postures for the sensor to actually capture the additional image of the imaging target based on the positional deviation in the direction, and
        store the robot program in the memory.

2. The system according to claim 1, wherein the processor is further configured to:
    set a center of each surface of a polyhedron containing the imaging target as a candidate for the imaging position, and sets a posture for capturing an image of each surface in a normal direction as a candidate for the imaging posture, to generate the plurality of candidates for the imaging position and the imaging direction.

3. The system according to claim 1, wherein the processor is further configured to:
    specify a number of directions in which the positional deviation is detectable based on the captured image obtained by the sensor among the positional deviations of the imaging target by the predetermined distance in the plurality of directions, with respect to each of the plurality of candidates for the imaging position and the imaging posture, and
    determine the one or more imaging positions and the imaging postures for the sensor to actually capture an image of the imaging target based on the number of directions in which the positional deviation is detectable.

4. The system according to claim 3, wherein the processor is further configured to:
    determine the one or more imaging positions and the imaging postures for the sensor to actually capture the additional image of the imaging target such that all the positional deviations by the predetermined distance in the plurality of directions are detectable.

5. The system according to claim 3, wherein the processor is further configured to:
    determine a candidate having a largest number of directions in which the positional deviation is detectable as one candidate for the one or more imaging positions and the imaging postures for the sensor to actually capture the additional image of the imaging target, among the plurality of candidates for the imaging position and the imaging posture.

6. The system according to claim 5, wherein the processor is further configured to:
    specify a direction in which the positional deviation is undetectable based on the images captured in the imaging position and the imaging posture determined as the imaging position and the imaging posture among the plurality of candidates for the imaging position and the imaging posture, and
    add a candidate for the imaging position and the imaging posture in which the positional deviation in the specified direction is detectable as one of the imaging positions and the imaging postures for the sensor to actually capture the additional image of the imaging target.

7. The system according to claim 1, wherein the processor is further configured to:
    output information indicating the one or more imaging positions and the imaging postures for the sensor to actually capture image of the imaging target, and
    correct the one or more imaging positions and the imaging postures for the sensor to actually capture the additional image of the imaging target according to input information when information on correction of at least one of the one or more imaging positions and the imaging postures for the sensor to actually capture the additional image of the imaging target is input.

8. The system according to claim 1, wherein the processor is further configured to:
  determine a sequence of moving the sensor according to the one or more imaging positions and the imaging postures for the sensor to actually capture the additional image of the imaging target such that motion time of the robot is minimized, and creates the robot program according to a determined sequence.

9. The system according to claim 1, wherein the processor is further configured to:
  store, in the memory, a motion plan of the robot for work in equipment including the imaging target,
  estimate a positional deviation amount of the imaging target by comparing the image actually captured by the sensor at the one or more imaging positions and the imaging postures for the sensor to actually capture the additional image of the imaging target, with a result of calculating the image obtained when captured by the sensor at the one or more imaging positions and the imaging postures for the sensor to actually capture the additional image of the imaging target based on the sensor information and the imaging target information,
  correct the motion plan of the robot based on the estimated positional deviation amount, and
  store the corrected motion plan of the robot in the memory.

10. The system according to claim 1, wherein the processor is further configured to:
  store, in the memory, equipment information including information on dimensions, shape, and disposition of equipment including the imaging target, and
  excludes the imaging position and the imaging posture in which it is not possible to capture the additional image of the imaging target due to interference with the equipment, from the plurality of candidates for the imaging position and the imaging posture, based on the equipment information.

11. The system according to claim 1, wherein the processor is further configured to:
  store, in the memory, information indicating features of the robot, and
  exclude the imaging position and the imaging posture that are unrealizable by the robot, from the plurality of candidates for the imaging positions and the imaging postures, based on information indicating features of the robot.

12. The system according to claim 1, wherein
  the sensor is a camera, and the imaging target is a positioning pin for installing a work object in equipment.

13. An method for creating a robot program based on a plurality of sensor positions and postures, the method comprising:
  storing sensor information in a memory, wherein the sensor information includes information on features of a sensor that captures an image of a target, and imaging target information including information on dimensions, shape, and disposition of an imaging target of the sensor,
  generating a plurality of candidates for an imaging position and an imaging posture of the imaging target by the sensor;
  determining whether or not positional deviation of the imaging target in a plurality of directions is detectable based on a captured image obtained by the sensor based on the sensor information and the imaging target information, with respect to each of the plurality of candidates for the imaging position and the imaging posture;
  determining one or more imaging positions and imaging postures for the sensor to actually capture an image of the imaging target;
  obtaining images from the sensor obtained before and after moving the imaging target by a predetermined distance in each of the plurality of directions, with respect to each of the plurality of candidates for the imaging position and the imaging posture, based on the sensor information and the imaging target information;
  determining that the positional deviation in the direction is detectable when a line width of a differential image of the images before and after movement by the predetermined distance exceeds a predetermined threshold value,
  creating the robot program for sequentially moving the sensor according to the one or more imaging positions and the imaging postures for the sensor to actually capture an additional image of the imaging target based on the positional deviation in the direction, and
  storing the robot program in the memory.

* * * * *